(12) United States Patent
Mullender et al.

(10) Patent No.: US 8,434,021 B2
(45) Date of Patent: Apr. 30, 2013

(54) CENTRALIZED USER INTERFACE FOR DISPLAYING CONTEXTUALLY DRIVEN BUSINESS CONTENT AND BUSINESS RELATED FUNCTIONALITY

(75) Inventors: Maarten W. Mullender, Duvall, WA (US); Sangya Singh, Bellevue, WA (US); Eric Danas, Sammamish, WA (US); Jay Hilwig, Seattle, WA (US); Karen MacCubbin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1417 days.

(21) Appl. No.: 11/393,020

(22) Filed: Mar. 30, 2006

(65) Prior Publication Data

US 2007/0124696 A1     May 31, 2007

Related U.S. Application Data

(60) Provisional application No. 60/740,926, filed on Nov. 30, 2005.

(51) Int. Cl.
  *G06F 3/048*     (2006.01)
(52) U.S. Cl.
  USPC ........... 715/809; 715/748; 715/749; 715/805; 715/808; 715/847
(58) Field of Classification Search .................. 715/764, 715/748, 749, 804, 805, 808, 809, 847
  See application file for complete search history.

(56) References Cited

U.S. PATENT DOCUMENTS

| | | | | |
|---|---|---|---|---|
| 5,546,525 A * | 8/1996 | Wolf et al. | ...................... | 715/809 |
| 6,215,490 B1 * | 4/2001 | Kaply | ........................... | 715/788 |
| 6,282,547 B1 * | 8/2001 | Hirsch | .......................... | 715/207 |
| 6,604,150 B1 | 8/2003 | Gebhart et al. | | |
| 6,629,129 B1 * | 9/2003 | Bookspan et al. | ............ | 709/204 |
| 6,948,133 B2 | 9/2005 | Haley | | |
| 7,325,204 B2 * | 1/2008 | Rogers | .......................... | 715/792 |
| 7,346,855 B2 * | 3/2008 | Hellyar et al. | ................ | 715/783 |
| 7,421,661 B1 * | 9/2008 | Canfield et al. | ............... | 715/752 |
| 8,095,882 B2 * | 1/2012 | Kashi | ............................ | 715/763 |
| 8,286,092 B2 * | 10/2012 | Hintermeister et al. | ...... | 715/804 |
| 2003/0101413 A1 * | 5/2003 | Klein et al. | ................... | 715/513 |
| 2003/0126050 A1 | 7/2003 | Theiss et al. | | |
| 2004/0122674 A1 * | 6/2004 | Bangalore et al. | ............ | 704/276 |
| 2004/0141016 A1 * | 7/2004 | Fukatsu et al. | ................ | 345/856 |
| 2005/0289470 A1 * | 12/2005 | Pabla et al. | ..................... | 715/751 |
| 2006/0101003 A1 * | 5/2006 | Carson et al. | ..................... | 707/3 |
| 2007/0011258 A1 * | 1/2007 | Khoo | ............................. | 709/206 |
| 2007/0094612 A1 * | 4/2007 | Kraft et al. | .................... | 715/808 |
| 2008/0195579 A1 * | 8/2008 | Kennis et al. | ..................... | 707/3 |

OTHER PUBLICATIONS

Chinese First Office Action dated Aug. 21, 2009 cited in Application No. 200680044793.0.

Han Gemin, "Media Preview Tool Hidden in Windows XP," System Navigation, Software & Services, Computer Knowledge and Technology, May 2005, pp. 13-15.

He Zhen, "Make Good Use of Your Common Task Bar," PC Fan Beginner Zone, Computer Fan, Year 2005, Issue 3, p. 10.

\* cited by examiner

*Primary Examiner* — Ba Huynh
(74) *Attorney, Agent, or Firm* — Merchant & Gould

(57) ABSTRACT

A centralized User Interface (UI) comprising a supplementary UI and a desktop UI is employed to bring in enterprise constructs into the desktop application. The supplementary UI is generated and dynamically positioned based on selections on the desktop application UI. Summary information associated with data that is to be synchronized or transferred between the desktop application and an LOB application is presented in the supplementary UI along with controls that enable a user to bind additional items to be synchronized.

20 Claims, 9 Drawing Sheets

CENTRALIZED USER INTERFACE FOR DISPLAYING CONTEXTUALLY DRIVEN BUSINESS CONTENT AND BUSINESS RELATED FUNCTIONALITY

CROSS-REFERENCE TO RELATED APPLICATIONS

The present application claims priority to U.S. Provisional Application No. 60/740,926, filed Nov. 30, 2005, entitled "Centralized User Interface for Displaying Contextually Driven Business Content and Business Related Functionality."

BACKGROUND

The success of an organization depends largely on the ability of its employees to discover, analyze, and act on Line Of Business (LOB) data and operational information. Unfortunately, there is traditionally a deep divide between enterprise systems used to collect and manage data and the desktop tools that information workers use to communicate and act on this information.

Applications that enable organizations to connect their desktop programs to line-of-business systems in an intuitive, cost-effective way may increase worker efficiency as well as employee satisfaction. By providing information workers with the information they need to make sound, timely business decisions, workers may become more productive and organizations more agile.

Enabling information workers to view and act on business data from within familiar desktop programs, such as electronic mail, spreadsheet, or word processing applications, may reduce workload on enterprise IT administrators and designers as well.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to a User Interface (UI) employed to provide summary information and controls associated with data that is being synchronized or transferred between two applications, such as a desktop application and an LOB application.

The UI is generated, positioned, and laid out based on one or more selections on the desktop application UI. Behavior of the UI, such as appearance and position, is dynamically determined based on the position, size, and other characteristics of the desktop application UI.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, enabling information workers to view and act on business data from within familiar desktop applications, such as electronic mail, spreadsheet, or word processing applications, is desired for efficiency, accuracy, and other business goals. A supplementary UI, such as a task pane, generated based on selections in a desktop application UI may provide summary information and content control over synchronization actions between the desktop application and an LOB application. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
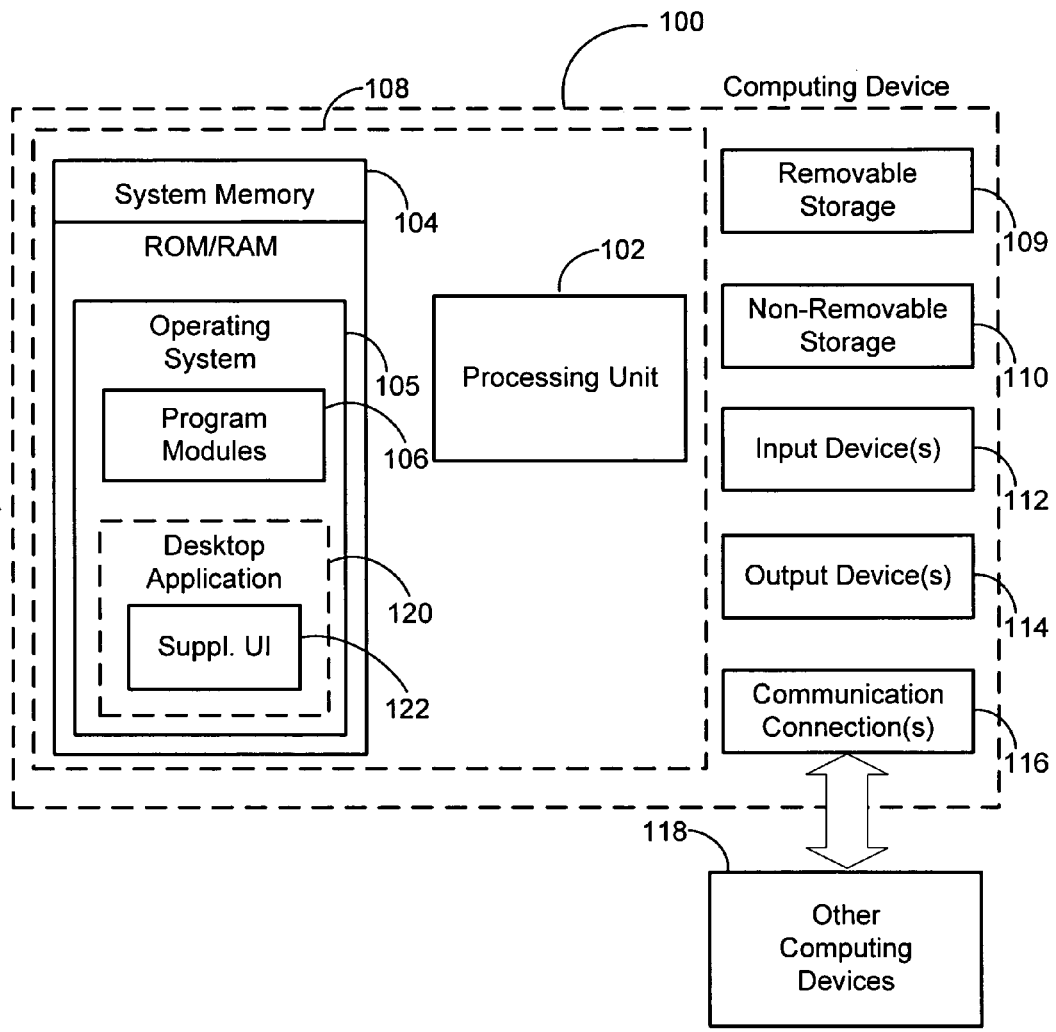
FIG. 1 is a block diagram of an exemplary computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106 and desktop application 120. Program modules 106 and desktop application 120 may be executed within operating system 105 or in another operating system. Furthermore, program modules 106 and desktop application 120 may be distributed programs that are executed in coordination with other computing devices.

According to embodiments, the desktop application 120 may comprise many types of programs. Examples of such programs include OUTLOOK®, WORD®, EXCEL®, and INTERNET EXPLORER® manufactured by MICROSOFT CORPORATION. Desktop application 120 may also comprise a multiple-functionality software application for providing many other types of functionalities. Such a multiple-functionality application may include a number of program modules, such as a word processing program, a spreadsheet program, a database program, and the like. The term desktop application is intended to distinguish the application from the LOB application, and should not be construed in any limiting sense. Desktop application 120 may essentially be any application used by a business system participant to perform computing actions including, but not limited to, emailing, scheduling, data entry, and the like.

According to some embodiments, desktop application 120 may include supplementary UI 122 that interacts with a business application such as a LOB application (not shown) and provides summary information associated with data that is synchronized or transferred between the two applications. Supplementary UI 122 may also provide control over the actions between the two applications. The supplementary UI may be integrated into desktop application 120 or may be part of another application and interact with desktop application 120. The basic integrated configuration is illustrated in FIG. 1 by those components within dashed line 108.

An LOB application is one of a group of critical computer applications that are vital to running an enterprise, such as accounting, supply chain management, and resource planning applications. LOB applications are usually large programs that contain a number of integrated capabilities and tie into databases and database management systems.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
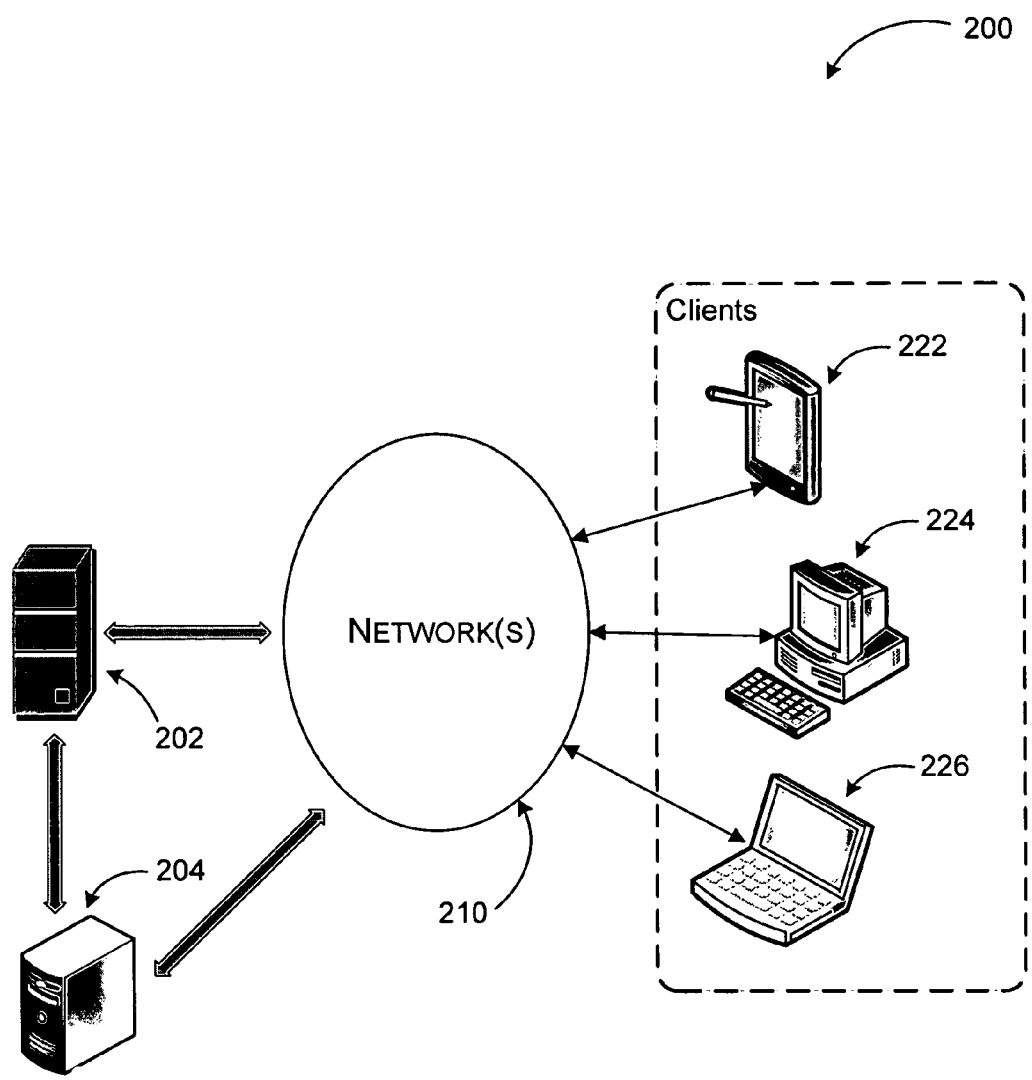
FIG. 2 illustrates a system where example embodiments may be implemented.

Referring to FIG. 2, a system where example embodiments may be implemented, is illustrated. System 200 includes application server 202, LOB application server 204, and clients 222, 224, 226. The term "client" may refer to a client application or a client device employed by a user to interact with one or both of a desktop application and an LOB application. Application server 202 may also be one or more programs or a server machine executing programs associated with the application server tasks. As described above, an such as a desktop application may be executed in any one of the clients or in application server 202 and shared in a distributed manner by clients 222, 224, and 226.

LOB application server 204 may execute an LOB application and interact with application server 202 and/or clients 222, 224, and 226 for sharing data, synchronizing data and processes, and the like.

Server 202, LOB application server 204, and clients 222, 224, 226 may communicate over one or more networks. The network(s) 210 may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

In a typical implementation, a user may interact with a desktop application such as an electronic mail application that includes a calendar utility, and enter time for appointments or tasks. Information associated with the calendar entries may be provided to an LOB application running on the LOB application server 204. A supplementary UI executed as an add-in part of the electronic mail application may provide summary information associated with the shared (synchronized) data to the user. The supplementary UI may also provide controls that enable the user to add, modify, or remove some or all of the data being transferred between the two applications. In some embodiments, the supplementary UI may be run as a distinct application and interact with the desktop application.

Figure 3:
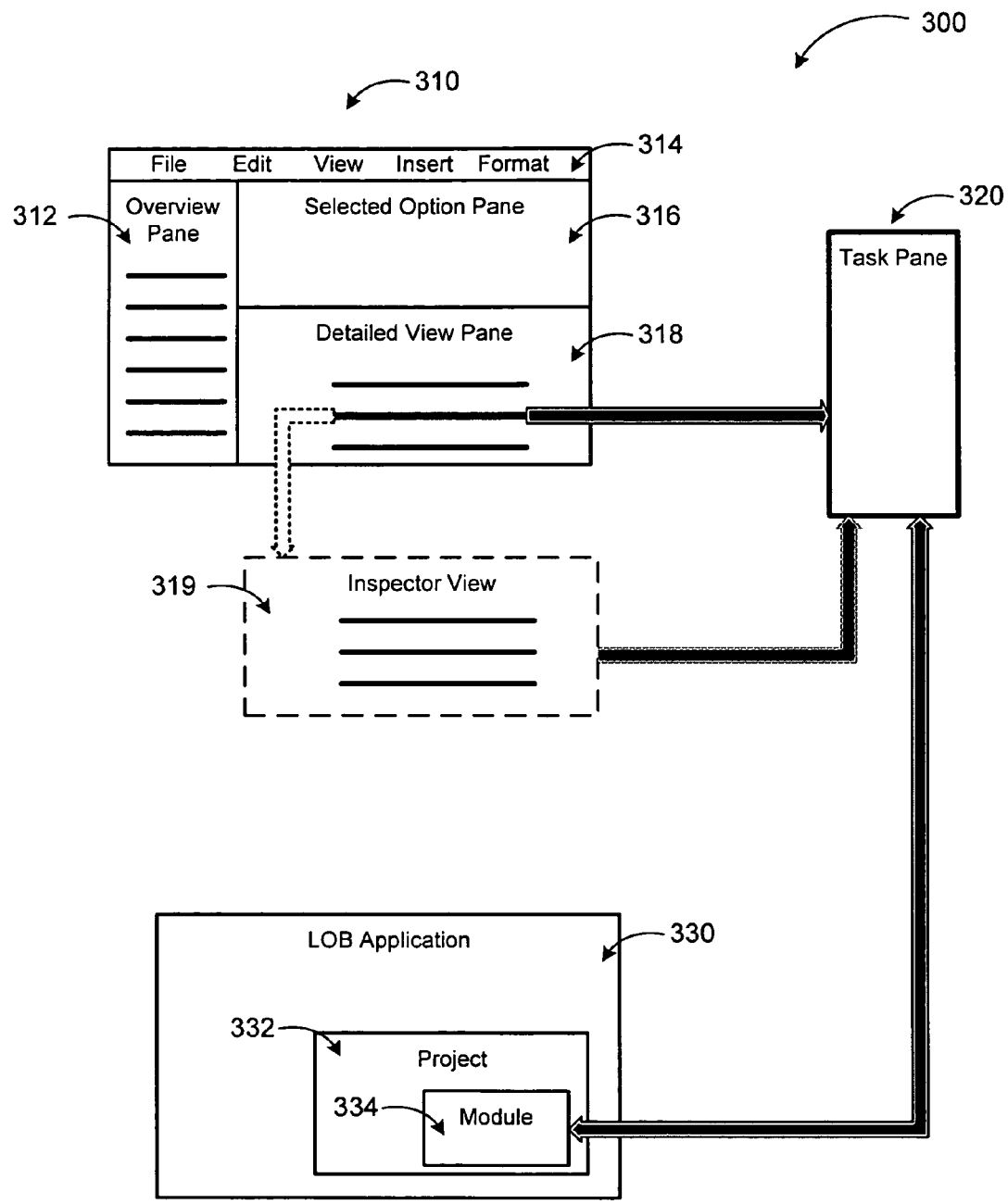
FIG. 3 illustrates an example centralized UI comprising a supplementary UI, explorer and inspector views of an application, an LOB application, and their interactions.

Now referring to FIG. 3, an example supplementary UI and its interactions with explorer and inspector views of an application and an LOB application are shown. Diagram 300 includes desktop application UI 310, an inspector view 319 of a portion of the electronic mail application UI 310, task pane 320, and LOB application 330. An electronic mail application is an example of a desktop application, in which embodiments may be implemented. Task pane 320 is an example of a supplementary UI as described previously.

According to embodiments, a centralized UI for displaying contextually driven business content and business related functionality may be provided as a supplementary UI accompanying the UI of an application, such as desktop application UI 310. The desktop application may include a scheduling application, a calendar application, a word processing application, a spreadsheet application, a database application, or a browser application in addition to an electronic mail application.

Desktop application UI 310 may include a number of regions such as command bar region 314, overview pane 312, selected option pane 316, and detailed view pane 318 (explorer view). The different panes may include elements of the desktop application that are associated with a second application through data binding. The second application may be a business application (e.g. LOB application 330).

For example, the desktop application may be an electronic mail application with scheduling capability. Overview pane 312 may present different options of the electronic mail application such as composing or reviewing mail, calendar, contact information, and the like. Selected option pane 316 may present contents of the option chosen from overview pane 312, such as calendar items. Detailed view pane 318 may present details of the item highlighted in the selected option pane 316, such as an appointment on a particular date.

In the above example, the appointment may be designated as an item to be reported to a business application for time keeping purposes. In that case, information associated with time, duration, and other relevant aspects of the appointment may be provided to LOB application 330.

Task pane 320 is configured to provide summary information, content control, and additional capabilities associated with the exchange (or synchronization) of data between the selected element(s) of desktop application UI 310 and LOB application 330.

LOB application 330 may be any business related application and may include one or more modules such as project 332. Project 332 may in turn include one or more modules such as workflows, tasks, subprojects, and the like. Module 334 represents an example subgroup within project 332 that keeps track of time entries from desktop application 310 in the above example.

Getting back to task pane 320, the task pane or supplementary UI may be generated based on selection of an element of desktop application UI 310, such as the calendar entry. Task pane 320 may include a number of regions that present object identification, dynamic messages, content control, description of direct actions, links to related reports, links to related actions, or contextual data. An order, a layout, an emphasis, or a selection of graphics, associated with the regions may be determined based on the selected element. Contents of the task pane are discussed in conjunction with FIGS. 6, 7, and 8 later in this text.

Task pane 320 may also be generated by selection of an element in inspector view 319 of the desktop application UI. Inspector view 319 is presentation of details of a chosen item from selected option pane 316 in a separate window. For example, emails may be viewed in an integral "Preview Pane" or in a separate window in OUTLOOK®. Thus, task pane 320 may be activated by a number of elements in desktop application UI 310 or associated inspector view(s) 319.

Task pane 320 may be dynamically positioned and its behavior controlled based on a position and size of desktop application UI 310, as well as selection of the element in the desktop application UI. Dynamic positioning of the supplementary UI (task pane 320) is discussed in detail below in conjunction with FIG. 4 and FIG. 5.

Task pane 320 may be activated automatically when an element is selected for the first time to provide the user an indication that the task pane is available as a tool for the user. If the user navigates away from the selected element or deselects that element, the task pane may be automatically deactivated. According to one embodiment, the task pane may not be reactivated when the element is selected for a second time, since the user is presumed to be aware of the task pane functionality at this point. The desktop application may include an option icon or similar items for the user to activate the task pane at will. On the other hand, a default setting may activate the task pane every time an element is selected.

When one or more inspector view windows are opened, the task pane may follow the active window, i.e. reflect information associated with the active inspector view window. The task pane is also positioned about the active inspector view window. As the open inspector view windows are closed, the task pane(s) associated with those may also be deactivated leaving open only the task pane associated with the currently active desktop application window.

Task pane 320 may be managed by an add-in module of the desktop application, or by a distinct application that interacts with the desktop application. Furthermore, task pane 320 may be presented as a separate UI from desktop application UI 310, or it may be an integrated part of desktop application UI 310. The above examples for desktop application and task pane are for illustration purposes only, and embodiments may be implemented with any application following the principles described herein.

Figure 4:
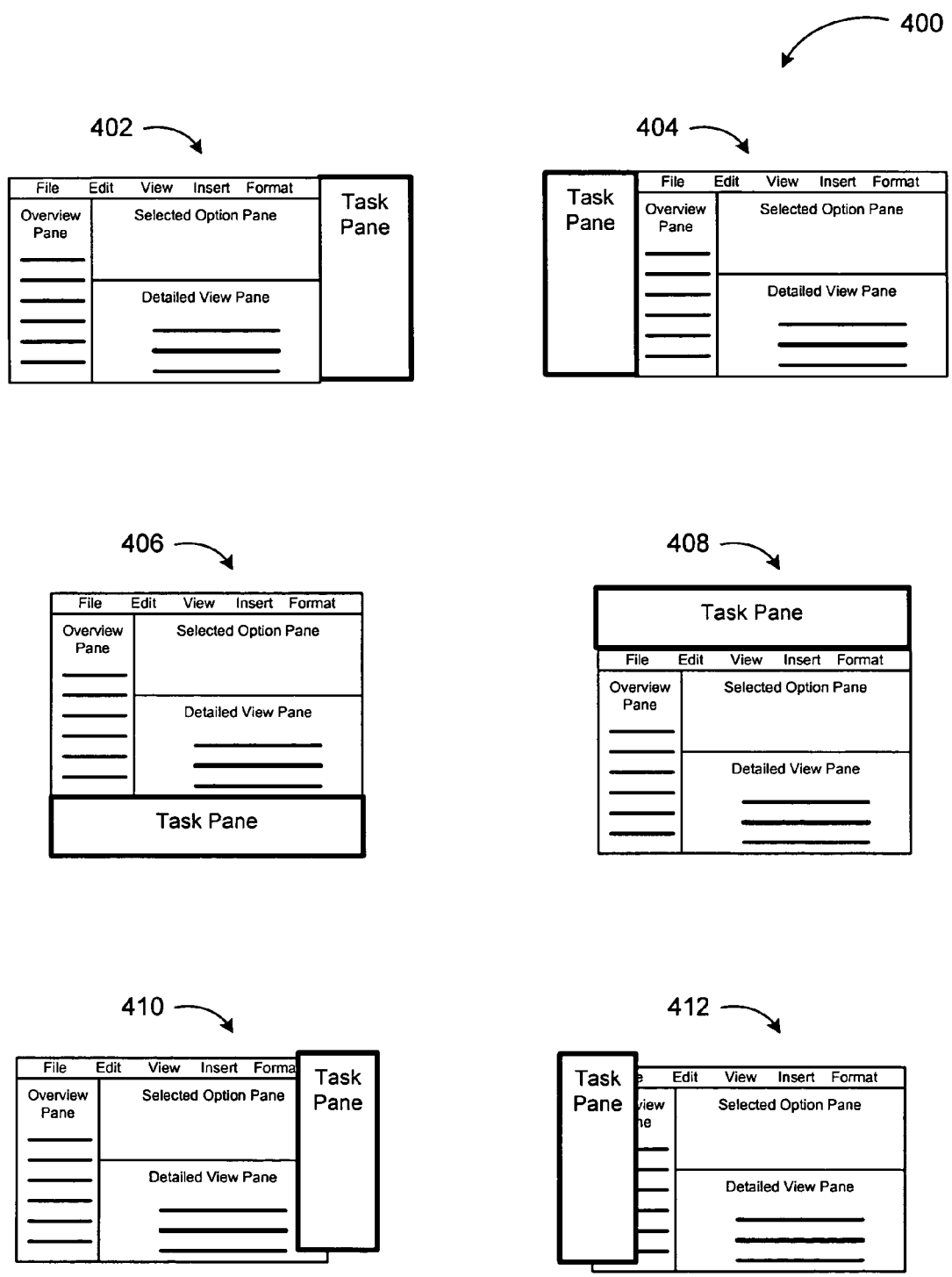
FIG. 4 illustrates example placements of a task pane in relation to an application UI according to embodiments.

FIG. 4 illustrates diagram 400 of example placements of a task pane in relation to an application UI according to embodiments. As explained previously, the task pane may be dynamically positioned about the desktop application UI and sized based on a size and position of the desktop application UI.

Example placements 402, 404, 406, and 408 show the task pane being sized to match a size (e.g. length or height) of the desktop application UI and placed adjacent to the desktop application UI (e.g. right, left, below, and above, respectively). Example placements 410 and 412 show the task pane being placed in hovering mode, where the task pane is placed over the desktop application UI in a shifted position. This mode may be employed when the desktop application UI covers a significant portion of the screen or when multiple application UI's are open at the same time.

According to some embodiments, the size and the placement of the supplementary UI (task pane) may be dynamically modified based on actions associated with the desktop application UI. For example, a change in size or placement of the desktop application UI may result in modification of the task pane size and position. Selection of a different element in the desktop application UI, which may result in different contents being displayed in the task pane, may also lead to dynamic repositioning and resizing of the task pane. Furthermore, placement modes (e.g. adjacent, hovering) may also be interchanged based on changes to the desktop application UI. The placements described in this portion are for illustration purposes only. The supplementary UI may be placed in any position and sized in any way suitable with the desktop application.

Figure 5:
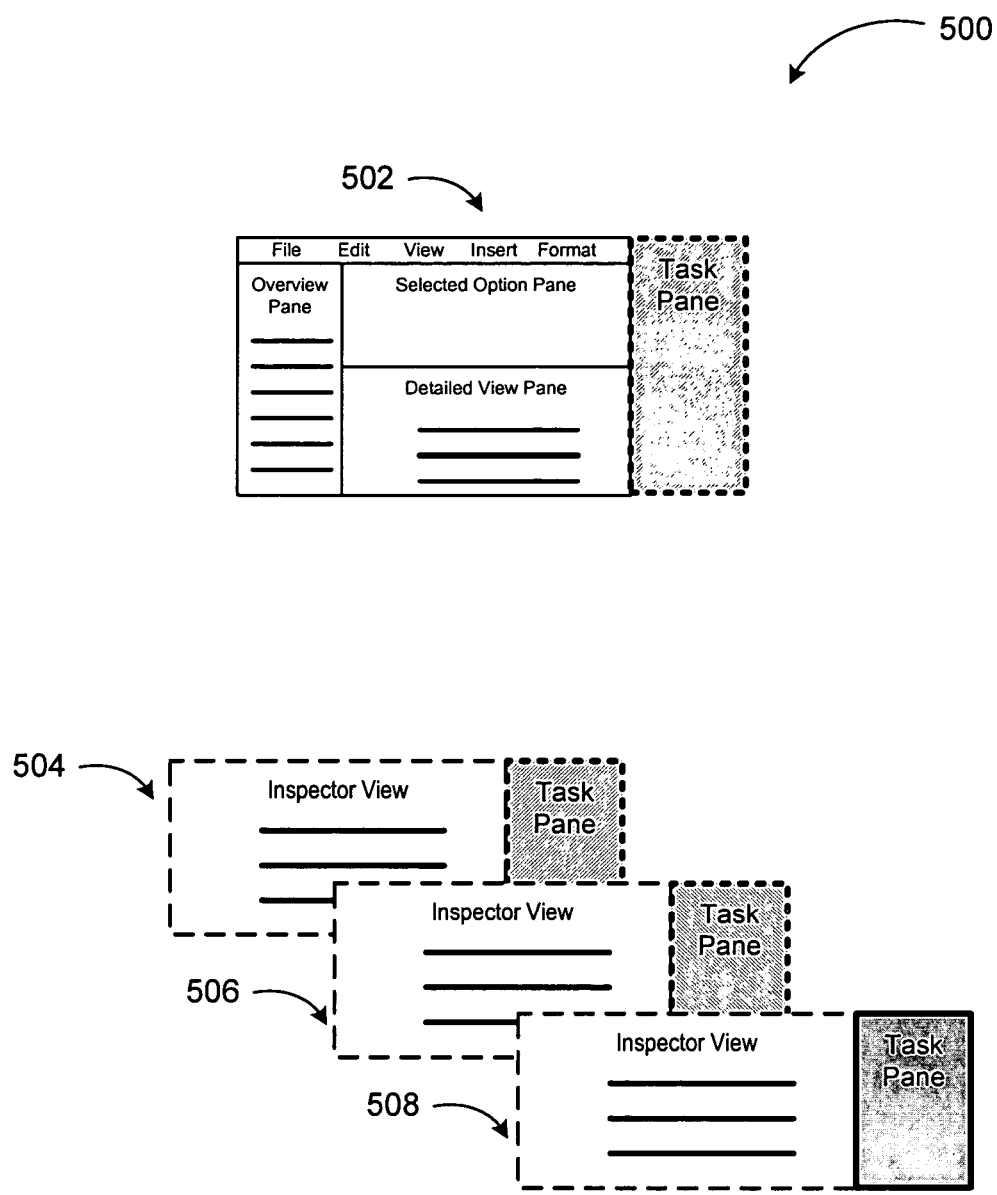
FIG. 5 illustrates example placement and use of task panes with explorer and multiple inspector views of an application UI.

FIG. 5 illustrates diagram 500 of example placement and use of task panes with explorer and multiple inspector views of an application UI. As explained previously, a desktop application may include a UI with an explorer view window (502) and multiple inspector view windows (e.g. 504, 506, 508). Due to the rules of the operating system, only one of the open windows is "active" at any given time, however. In a typical implementation, the task pane is first activated by the explorer view window of the desktop application UI. As inspector view windows are opened, each may activate its own corresponding task pane while the task panes associated with "inactive" UI windows are deactivated.

In one embodiment, the activation and deactivation of the task panes may take the form of the task pane simply following the currently active desktop application UI window, and all others disappearing from the screen. In another embodiment (as shown in the figure), task panes associated with inactive application windows may be presented in an inactive mode with only the active task pane performing actions described previously. If the active application UI window is closed, the corresponding task pane may also be closed and one of the inactive ones corresponding to the new active window activated.

Figure 6:
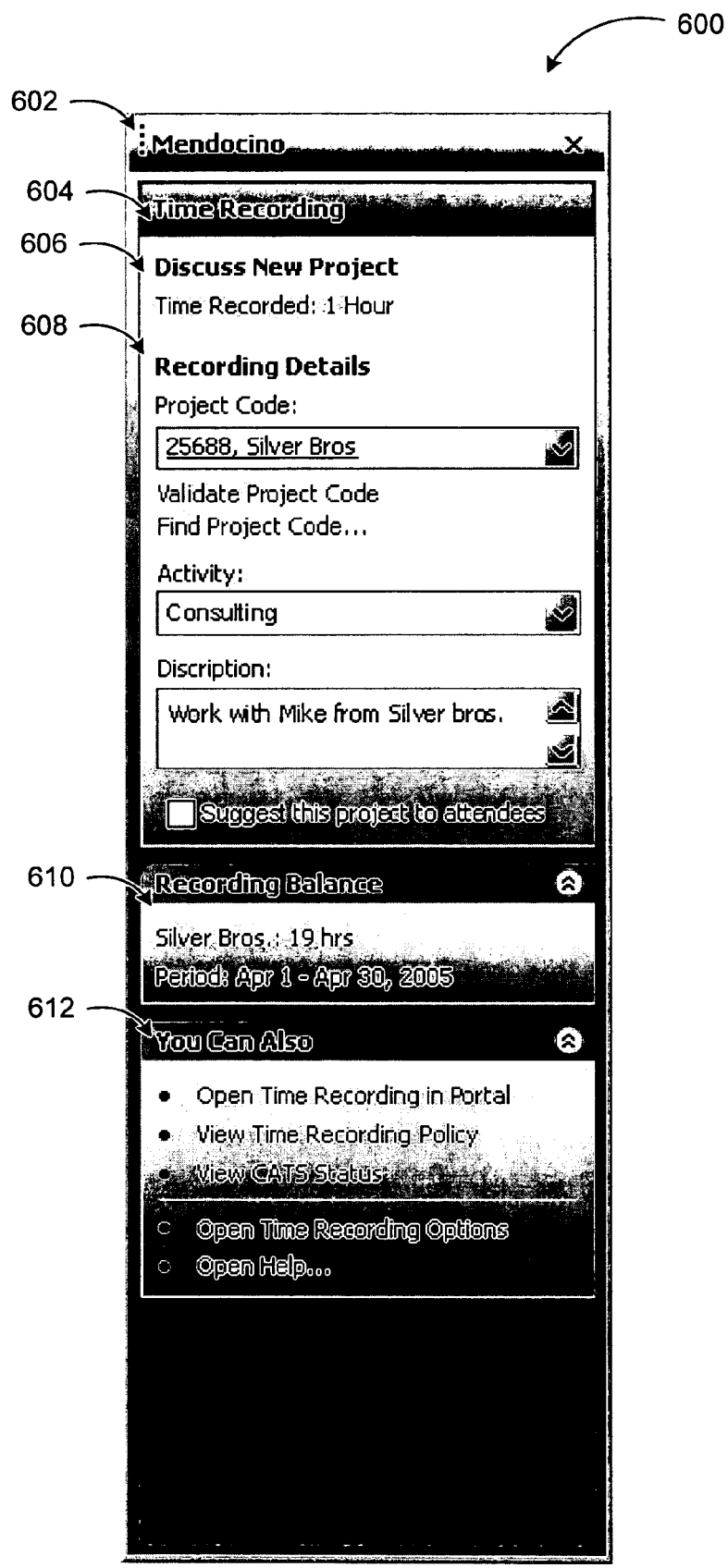
FIG. 6 illustrates an example task pane and its contents according to one embodiment.

FIG. 6 illustrates an example task pane 600 and its contents according to one embodiment. Example task pane 600 is employed to provide summary information and content controls for exchange of data between a scheduling application and an LOB application keeping track of time.

Task pane 600 has at the top level title 602. Title 602 may be used to define the task pane and be universal. Title 602 is followed by subheading 604. Subheading 604 may be used to provide an application specific summary definition of the task pane. In example task pane 600, the subheading 604 is Time Recording indicating that the task pane is associated with time keeping activities. In one embodiment, subheading 604 may include control icons such as dropdown menu controls. Examples of different configurations for subheading 604 are provided in FIG. 7.

Subheading 604 is followed by an object identification region 606. Object identification region 606 provides summary information about the item from the scheduling application, which is being synchronized with the LOB application. In the example, the timekeeper item is defined as "Discuss New Project" (retrieved from scheduling application entry), and its duration is shown as 1 hour. Object identification region 606 is followed by content control region 608. Content control region 608 provides options to the user to modify attributes and aspects of the data being synchronized. In the example, content control region 608 is titled "Recording Details", and provides options to modify a project code, an activity definition, and a brief description for the activity. The example task pane provides these options as fixed options in dropdown menu style. In other embodiments, the user may be provided the option of entering his/her own information for the attributes or aspects.

Content control region 608 is followed by contextual data region 610. Contextual data region 610, titled "Recording Balance" in the example, provides summary information associated with the project such as total recorded time and the period of recording. This information is typically retrieved from the LOB application. Contextual data region 610 is followed by related actions region 612. Related actions region 612, titled "You Can Also" provides links to activities for the user associated with the time keeping operation.

Task pane 600 and its contents are provided for illustration purposes only. A supplementary UI to provide contextual business content and business related functionality is not limited to the example task pane, and may be implemented in other ways using the principles described herein. Specifically, type, layout, and order of regions within the supplementary UI may be selected in many different way such as those described in conjunction with FIG. 8.

Figure 7:
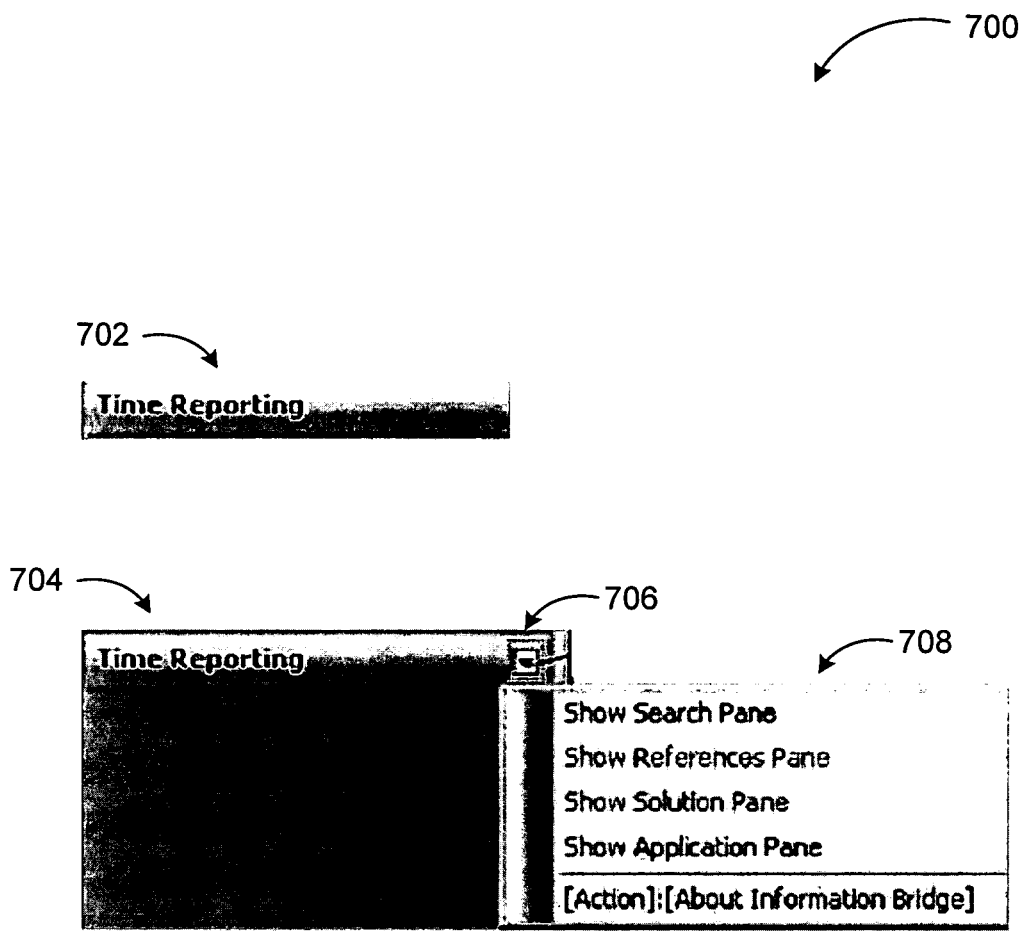
FIG. 7 illustrates two example styles of subheadings for a task pane according to embodiments.

FIG. 7 illustrates two example styles for a subheading of a task pane according to embodiments. Subheading 702 is the application specific subheading of the example task pane of FIG. 6 without control icons.

Subheading 704, titled "Time Reporting", includes a dropdown menu icon 706 and available menu items 708 associated with the icon. The dropdown menu icon 706 provides another method of offering the user choices, such as selecting additional panes. In some embodiments, options may be provided to the user as tabs along one edge of the UI. The user may then select one of the available panes by clicking on the related tab.

The example implementation of dropdown menu icons and tabs to provide selections to the user is intended for illustration purposes only and should not be construed as a limitation on embodiments. Other embodiments using different methods for providing a supplementary UI to present summary information and content controls may be implemented using the principles described herein.

Figure 8:
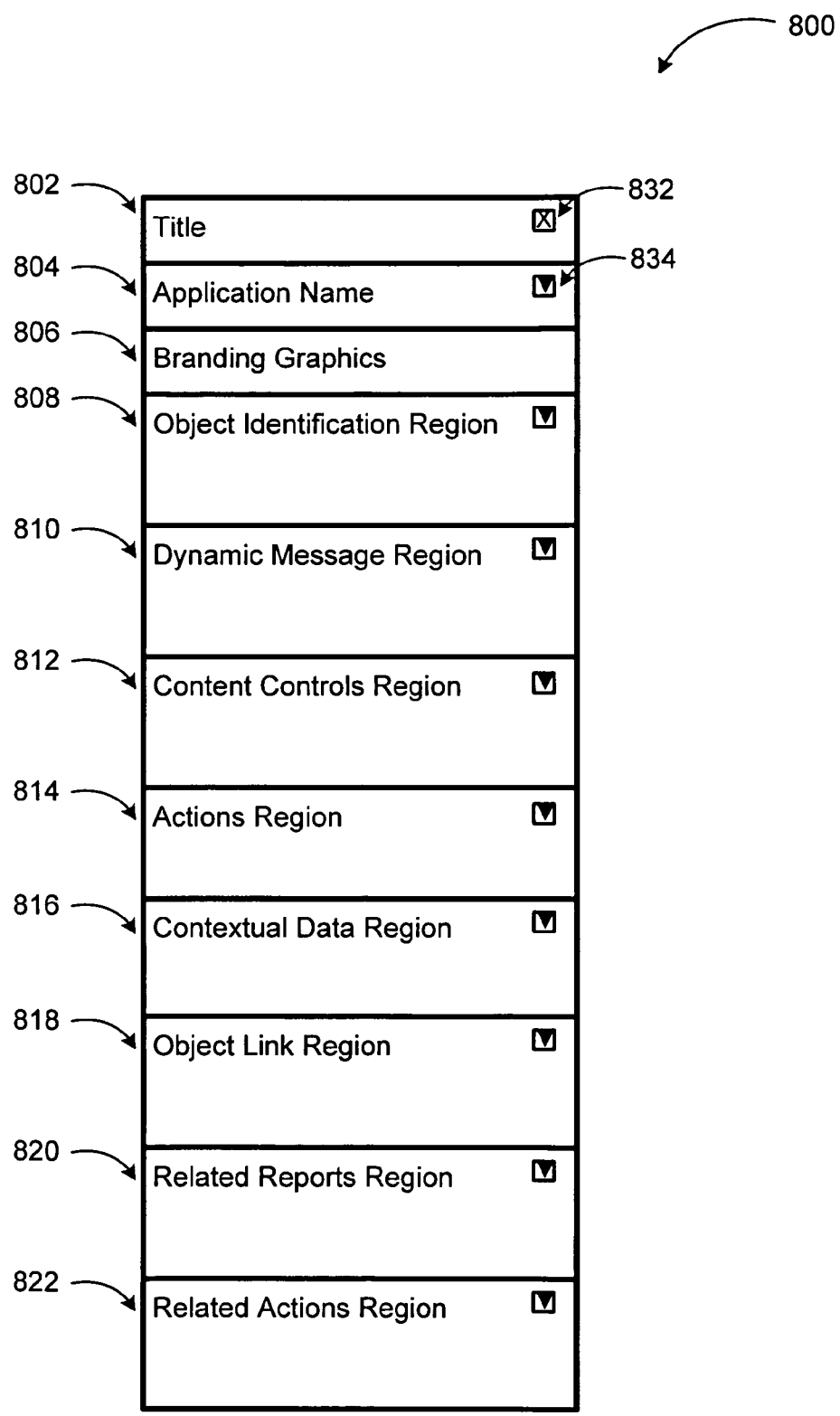
FIG. 8 illustrates a sampling of content regions for a task pane according to embodiments.

FIG. 8 illustrates a sampling of content portions for a task pane 800 according to embodiments. Task pane 800 includes title region 802 as described in FIG. 6. Title region 802 may include control icons such as an open/close icon 832 as well. Title region 802 is followed by subheading 804, which is typically application specific and may include the application name. Because task pane 800 may be used with multiple applications, subheading 804 may include a dropdown menu icon 834 to select from the available applications.

Branding graphics region 806 may be used to provide graphics associated with the desktop or LOB applications tied together by the task pane. Branding graphics 806 is followed by an object identification region 808. Object identification region 808 may be used to identify the element of the desktop application, its counterpart module in the LOB application, as well as to provide status information. Multiple object identification regions may be collapsed or expanded using a dropdown menu icon.

Dynamic message region 810 is used to provide summary information such as status of the activity. For example, in a workflow application, status of different workflow tasks may be reflected in dynamic message region 810. Content controls region 812 includes options for the user to modify attributes, aspects of data being synchronized or exchanged between the two applications. Actions region 814 may provide links to actions associated with the LOB application. For example, in a time keeping application, the actions region 814 may include a link that enables the user to open a new timekeeper item or a new project. The links in actions region 814 may be in form of hyperlinks, buttons, and the like.

Another region in task pane 800 is contextual data region 816. Contextual data region 816 may provide information retrieved from the LOB application such as total recorded time balance in a time keeping application. Contextual data region 816 is followed by object link region 818. Object link region 818 includes links to additional objects (e.g. "Recent Requests") associated with the LOB application and the desktop application.

A further region in task pane 800 is related reports region 820. Related reports region 810 may provide links to related reports in form of text hyperlinks, buttons, tree style, and the like. Related actions region 822 is similar to the related reports region 820, and provides links to actions within the desktop or LOB applications associated with the current task pane.

Task pane 800 may include many more or fewer regions in any order. The regions may be designed to appear only when they include an item within themselves or may be listed in a dropdown menu. The regions may also include additional elements such as graphics, control icons, and the like.

Figure 9:
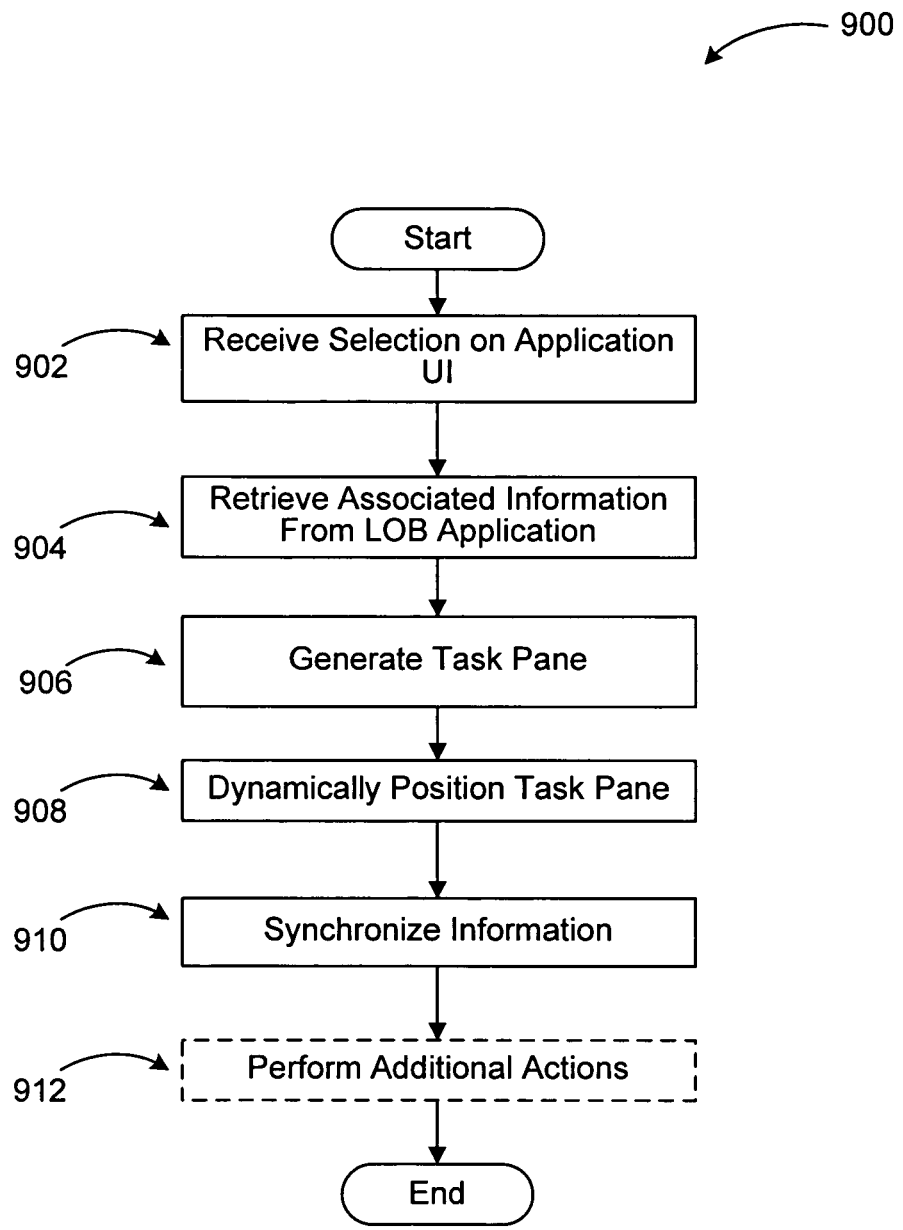
FIG. 9 illustrates a logic flow diagram for a process of using a supplementary UI (task pane) according to embodiments.

FIG. 9 illustrates a logic flow diagram for process 900 of using a supplementary UI according to embodiments. Process 900 may be implemented in an application server or client as described in FIG. 2.

Process 900 begins with operation 902, where a selection on the application UI is received. As described previously, the selection may be activation of a link associated with a calendar entry, a task entry, and the like. In a typical implementation, the selected item is associated with a corresponding item in an LOB application. Processing advances from operation 902 to operation 904.

At operation 904, information associated with the selected item is retrieved from the LOB application. In the scheduling example, such information may include data associated with a project task, and the like. Processing moves from operation 904 to operation 906.

At operation 906, the supplementary UI (in the example, the task pane) is generated. The contents of the task pane such as message, object, and control regions may be created and ordered based on the information retrieved from the LOB application and the application UI. Regions within the supplementary UI include information received from the application UI and retrieved from the LOB application. Processing advances from operation 906 to operation 908.

At operation 908, the task pane is dynamically positioned based on a position and size of the application UI. Specific examples of task pane positioning are discussed in conjunction with FIGS. 4 and 5. The task pane may, however, be positioned in any predefined way in relation to the application UI. Operation 908 is followed by operation 910.

At operation 910, the data is synchronized. Some data may be synchronized automatically between the application and the LOB application. Other portions of the data may be synchronized upon approval by the user. In other embodiments, the user may be provided the option of binding additional data to be synchronized. Processing advances from operation 910 to optional 912.

At optional operation 912, additional actions associated with transferring data between the application and the LOB application may be performed. Such actions may include modifying data to be synchronized, setting or modifying of properties and attributes of information to be exchanged between the applications, and the like. After optional operation 912, processing moves to a calling process for further actions.

The operations included in process 900 are for illustration purposes. Providing a centralized UI for displaying contextually driven business content and business related functionality may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to be executed at least in part in a computing device for displaying contextually driven content, the computer-implemented method comprising:
determining a first element of a first application User Interface (UI) that is associated with a second application through data binding, the first element being a first inspector view element of the first application;
generating a supplementary UI, wherein generating the supplementary UI includes generating at least one region configured to provide information associated with data bound between the first element of the first application UI and the second application;
synchronizing at least a portion of the information included in the supplementary UI with the bound data associated with the second application; and
controlling a location of the supplementary UI in response to an activation of a second inspector view and a deactivation of the first inspector view.

2. The computer-implemented method of claim 1, wherein determining the first element of the first application UI includes detecting a selection associated with the first element.

3. The computer-implemented method of claim 2, wherein generating the supplementary UI includes activating the supplementary UI automatically when the first element is selected for the first time.

4. The computer-implemented method of claim 3, further comprising:
deactivating the supplementary UI when the first element is deselected for the first time; and
reactivating the supplementary UI responsive to a user action during subsequent selections of the first element.

5. The computer-implemented method of claim 1, further comprising:
providing at least one other region in the supplementary UI for content control, wherein the content control enables a user to specify a second element of the first application UI to be associated with the second application.

6. The computer-implemented method of claim 1, further comprising:
providing at least one other region in the supplementary UI for content control, wherein the content control enables a user to modify data to be synchronized between the first application and the second application.

7. The computer-implemented method of claim 1, further comprising providing at least one other region in the supplementary UI for dynamic messages.

8. The computer-implemented method of claim 1, further comprising:
providing at least one other region in the supplementary UI for linking related reports associated with the first element and related actions associated with the first element.

9. The computer-implemented method of claim 1, wherein the first application UI is operatively associated with at least one first application from a set of: an electronic mail application, a scheduling application, a calendar application, a word processing application, a spreadsheet application, a database application, and a browser application.

10. The computer-implemented method of claim 1, wherein the second application is a Line of Business (LOB) application.

11. A system for providing information and control over data exchanged between a desktop application and a Line of Business (LOB) application, the system comprising:
   a memory storage; and
   a processing unit coupled to the memory storage, wherein the processing unit is operative to:
      provide a desktop application user interface (UI) having a plurality of segments including a plurality of elements, wherein a portion of the plurality of elements are associated with the LOB application,
      provide a plurality of task panes associated with the plurality of segments, wherein each task pane of the plurality of task panes is configured to provide content control and information associated with data to be exchanged between the desktop application and the LOB application based on a selected segment of the plurality of segments in the desktop application UI,
      position an active task pane of the plurality of task panes at a location corresponding to an active segment's location;
      receive a selection of a first element within a first segment of the desktop application UI, the first element comprising a first inspector view element of the desktop application UI,
      activate a first task pane associated with the first segment of the plurality of segments in the desktop application UI,
      synchronize, with the LOB application, a first set of data corresponding to a first content of the first task pane associated with the first selected element,
      receive a selection of a second element within second first segment of the desktop application UI, the second element comprising a second inspector view element of the desktop application UI,
      deactivate the first task pane, wherein the processing unit being operative to deactivate the first task pane comprises the processing unit being operative to deactivate the first take pane in response to an deactivation of the first inspector view element and an activation of the second inspector element,
      activate a second task pane associated with the second segment of the plurality of segments in the desktop application UI, and
      synchronize, with the LOB application, a second set of data corresponding to a second content of the second task pane associated with the second selected element.

12. The system of claim 11, wherein each task pane is managed by an add-in module of the desktop application.

13. The system of claim 11, wherein each task pane is dynamically positioned and sized adjacent to the desktop application UI based on a size of the desktop application UI and a position of the desktop application UI.

14. The system of claim 11, wherein each task pane is dynamically positioned and sized to be hovering over to the desktop application UI based on a size of the desktop application UI and a position of the desktop application UI.

15. The system of claim 11, wherein the desktop application UI includes a split view display frame and at least one inspector view display frame to display each of the plurality of segments.

16. The system of claim 15, wherein each task pane is further associated with and dynamically positioned about one of an active one of the split view display frame and the at least one inspector view display frame of the desktop application UI.

17. The system of claim 11, wherein each task pane provides, based on the selected segment and the plurality of elements within the selected segment, a layout of regions associated with at least one from a set of: object identification, dynamic messages, content control, description of direct actions, links to related reports, links to related actions, and contextual data.

18. A computer-readable storage medium having a set of instructions which when executed performs a method for providing information and data control associated with data being exchanged between a desktop application and a Line of Business (LOB) application, the method executed by the set of instructions comprising:
   receiving a selection associated with a first element of a desktop application user interface (UI), wherein the first element is within a first inspector view of the desktop application UI and is associated with the LOB application through data binding;
   generating, in response to the selection, a supplementary UI to present content associated with the selected first element, the content providing at least one from a set of: object identification, dynamic messages, content control, description of direct actions, links to related reports, links to related actions, and contextual data;
   synchronizing the content included in the supplementary UI with the associated bound data of the LOB application;
   positioning the supplementary UI dynamically about the desktop application UI, wherein positioning the supplementary UI dynamically about the desktop application UI comprises controlling a location of the supplementary UI based on actions associated with the desktop application UI, wherein controlling the location of the supplementary UI based on the actions associated with the desktop application UI comprises relocating the supplementary UI in response to an activation of a second inspector view of the desktop application UI and a corresponding deactivation of the first inspector view of the desktop application UI.

19. The computer-readable storage medium of claim 18, further comprising:
   activating the supplementary UI automatically when the first element is selected for the first time;
   deactivating the supplementary UI when the first element is deselected for the first time;
   reactivating the supplementary UI responsive to a user action during subsequent selections of the first element; and
   associating the supplementary UI with an active inspector view of the desktop application UI when multiple inspector views are opened.

20. The computer-readable storage medium of claim 18, wherein generating, in response to the selection, a supplementary UI to present content associated with the selected first element comprises determining an action included within the supplementary UI based on an attribute of the first element.

* * * * *